(12) United States Patent (10) Patent No.: US 8,002,661 B2
Sekiya (45) Date of Patent: Aug. 23, 2011

(54) CONTINUOUSLY VARIABLE TRANSMISSION

(75) Inventor: Mitsuru Sekiya, Odawara (JP)

(73) Assignee: Mikuni Corporation, Tokyo (JP)

( * ) Notice: Subject to any disclaimer, the term of this patent is extended or adjusted under 35 U.S.C. 154(b) by 344 days.

(21) Appl. No.: 12/379,999

(22) Filed: Mar. 5, 2009

(65) Prior Publication Data

US 2009/0176616 A1 Jul. 9, 2009

Related U.S. Application Data

(63) Continuation of application No. PCT/JP2007/066857, filed on Aug. 30, 2007.

(30) Foreign Application Priority Data

Sep. 8, 2006 (JP) ................................. 2006-244370

(51) Int. Cl.
*F16H 15/48* (2006.01)
*F16H 13/14* (2006.01)
*F16H 13/06* (2006.01)

(52) U.S. Cl. ........ 475/190; 475/193; 475/195; 475/194; 475/197

(58) Field of Classification Search .................. 475/185, 475/186, 190–195, 197
See application file for complete search history.

(56) References Cited

U.S. PATENT DOCUMENTS

| 2,929,273 | A | | 3/1960 | Weber | |
|---|---|---|---|---|---|
| 3,293,947 | A | * | 12/1966 | Chery | 475/189 |
| 3,516,305 | A | * | 6/1970 | Chery | 475/186 |
| 7,166,056 | B2 | * | 1/2007 | Miller et al. | 476/37 |
| 7,575,530 | B2 | * | 8/2009 | Sekiya | 475/193 |

FOREIGN PATENT DOCUMENTS

| JP | 6-280961 | 10/1994 |
|---|---|---|
| JP | 11-210776 | 8/1999 |

OTHER PUBLICATIONS

International Search Report for PCT/JP2007/066857, mailed Dec. 11, 2007.
International Search Report issued Apr. 2, 2009 in corresponding International Patent Application PCT/JP2007/066857.

* cited by examiner

*Primary Examiner* — Tisha D Lewis

(57) ABSTRACT

A continuously variable transmission includes an input shaft rotatably supported in a housing; a first speed change unit and a second speed change unit, provided within the housing and disposed facing each other symmetrically with respect to a plane normal to the axial direction of the input shaft, to continuously vary the speed of rotation of the input shaft using traction force; an output rotating gear supported to be able to rotate freely about the input shaft so that the rotation of the output rotating gear is synchronized with the rotation which has been varied in speed by the first speed change unit and the second speed change unit; and an output shaft. The torque of the input shaft can be doubled by the two speed change units while continuously varying the speed, and the thrust loads generated in the axial direction of the input shaft cancel each other out.

8 Claims, 7 Drawing Sheets

Fig. 1 – Prior Art

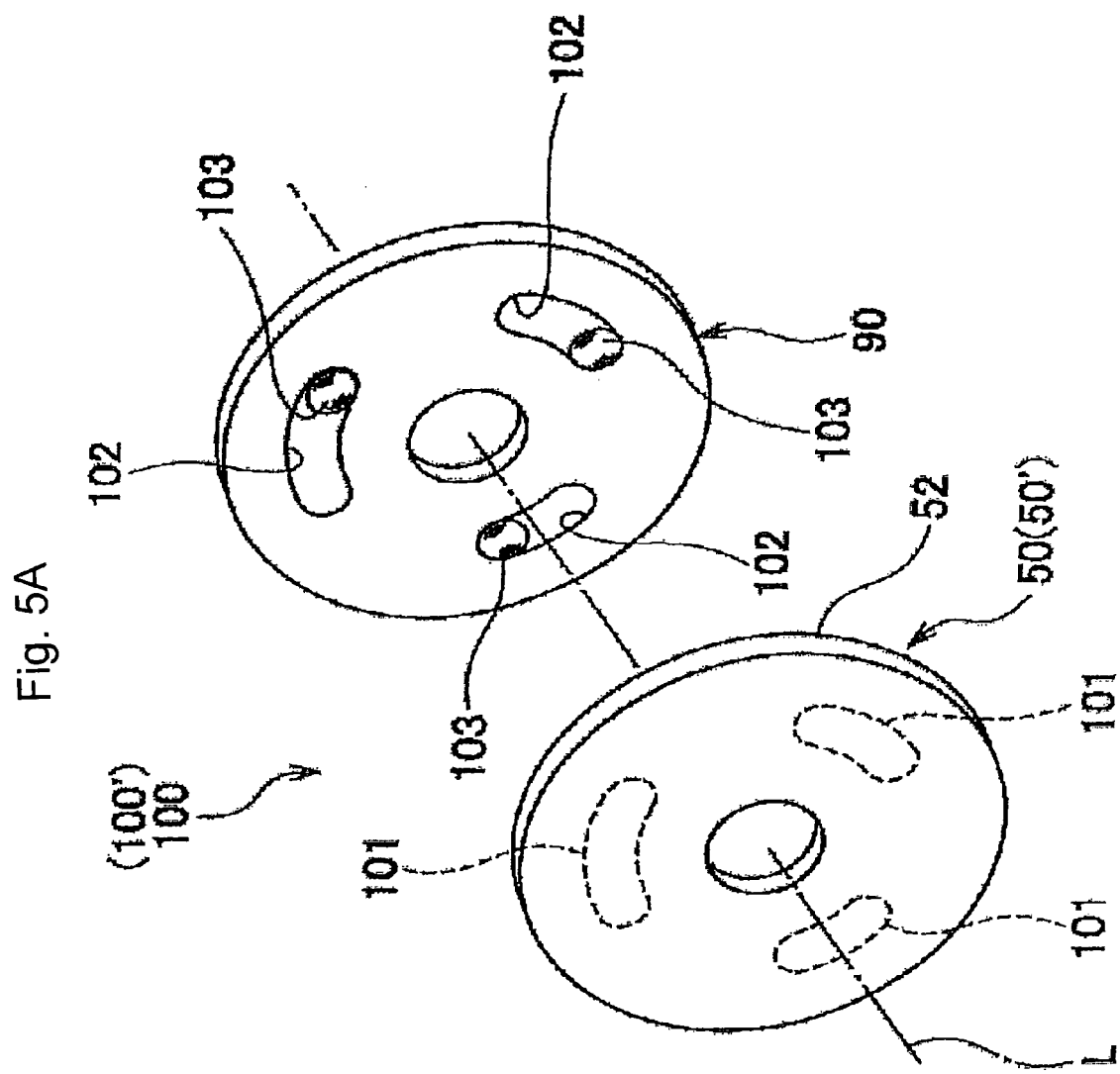

CONTINUOUSLY VARIABLE TRANSMISSION

CROSS-REFERENCE TO RELATED APPLICATIONS

This application is a continuation, filed under 35 U.S.C. §111(a), of PCT international application No. PCT/JP2007/066857, filed Aug. 30, 2007. This application claims the priority benefit of Japanese patent application No. 2006-244370, filed Sep. 8, 2006, and PCT international application No. PCT/JP2007/066857, filed Aug. 30, 2008, the disclosures of which are incorporated herein by reference.

BACKGROUND OF THE INVENTION

1. Field of the Invention

The present invention relates to a continuously variable transmission that continuously varies the rotation speed of the input shaft and transmits the speed to the output shaft by using a traction drive using traction force, and more particularly relates to a continuously variable transmission that continuously varies the speed using conical planetary rollers.

2. Description of the Related Art

As shown in FIG. 1, a conventional continuously variable transmission that includes an input shaft 3 and an output shaft 4 rotatably supported via bearings 2 on flanges 1a connected to both sides of a cylindrical housing 1, a sun roller (inner wheel) 5 in the shape of the frustum of a cone connected to the input shaft 3 using a key 3a so that the sun roller 5 rotates integrally with the input shaft 3, a holder 6 rotatably supported via a bearing 3b on the input shaft 3, a plurality of tapered rollers (planetary rollers) 7 rotatably supported on the holder 6 that roll on the outer peripheral surface of the sun roller 5, an output ring (follower outer wheel) 8 that rotates integrally with the output shaft 4 and contacts the outside of the tapered rollers 7, a speed change ring (rotationally fixed outer wheel) 9 that contacts the outside of conical portions 7a integrally provided on the tapered rollers 7 and that can only be driven reciprocally in the direction of the generating lines of the conical portions 7a, and so on, is known. See, for example, Japanese Patent Application Laid-open No. H6-280961.

In this continuously variable transmission, when the input shaft 3 rotates, the sun roller 5 rotates integrally with it, the tapered rollers 7 that contact the outside of the sun roller 5 rotate and revolve, the output ring 8 rotates as a result of the rotation of the tapered rollers 7, the output shaft 4 that is integral with the output ring 8 rotates, and the rotation speed of the output shaft 4 is increased or decreased in accordance with the position of the speed change ring 9.

However, in this continuously variable transmission, the normal load at the contact surface of the tapered rollers (planetary rollers) 7 and the sun roller 5, the normal load at the contact surface of the tapered rollers 7 and the output ring 8, and the normal load at the contact surface of the conical portions 7a of the tapered rollers 7 and the speed change ring 9 depends on the initial assembly accuracy. Also, there is no means of correcting the variation in the normal loads due to changes with time, and the like. Therefore it may not be possible to obtain the necessary traction force, and there is a possibility that the speed change effect will not be reliably obtained. In particular, the tapered rollers 7 are supported cantilevered from the holder 5, so the conical portions 7a of the tapered rollers 7 can be easily bent, so it is difficult to greatly increase the contact force with the speed change ring 9.

Also, a thrust load is generated in the direction of the axes of the input shaft 3 and the output shaft 4 as the normal loads increase, and this thrust load is received by the bearings 2 of the input shaft 3 and the output shaft 4 or the housing 1. Therefore, the bearings 2 and the housing 1 deform with time, or the temperature of the lubricating oil rises due to heat in the area around the bearings, and so on, so there is the danger of wear and reduction in power transmission efficiency, and so on. On the other hand, if the stiffness of the housing 1 is increased as a measure against deformation, this will cause the size or weight to increase.

SUMMARY OF THE INVENTION

With the foregoing in view, it is an aspect of the present invention to provide a continuously variable transmission capable of ensuring sufficient traction force or transmission torque, increasing the transmission efficiency, canceling out the thrust load in the input shaft direction associated with an increase in the normal load, and capable of stably and reliably changing the speed to the desired speed change ratio, while simplifying the structure, reducing the size, improving the functional reliability, reducing the cost, and so on.

The continuously variable transmission according to an embodiment of the present invention includes an input shaft rotatably supported in a housing; a first speed change unit and a second speed change unit, provided within the housing, facing each other and symmetrically disposed with respect to a plane normal to the axial direction of the input shaft, for continuously varying the speed of rotation of the input shaft in use of traction force; an output rotating body supported to be able to rotate freely about the input shaft so that the rotation of the output rotating body is synchronized with the rotation which has been varied in speed by the first speed change unit and the second speed change unit; and an output shaft rotatably supported in the housing to rotate in synchronization with the output rotating body.

According to this structure, the speed of the rotational drive force of the input shaft may be continuously varied by the first speed change unit and the second speed change unit, and output as rotational drive force from the output shaft via the output rotating body.

In this way, the torque of the input shaft can be doubled by the two speed change units (the first speed change unit and the second speed change unit) while continuously varying the speed, and also the two speed change units (the first speed change unit and the second speed change unit) are disposed symmetrically with respect to a plane normal to the axial direction of the input shaft and facing each other, so the thrust loads generated in the two speed change units in the axial direction of the input shaft act in opposite directions and cancel each other out. Therefore, it is possible to prevent the application of unreasonable load on the housing or the bearing of the input shaft, and so on, also, the temperature rise in the area around the bearing and elsewhere can be reduced, so it is possible to form a lubricating oil film on the contact surfaces and reliably obtain the traction force.

In the above structure, a structure in which the first speed change unit includes a first sun roller with a frustum conical shape provided to rotate integrally with the input shaft; a plurality of first planetary rollers provided to roll on an outer peripheral surface of the first sun roller; a first output ring provided to contact internally with the first planetary rollers and to be able to freely rotate; and a first speed change ring provided to contact internally with conical portions formed integrally with the first planetary rollers and to be able to move in the axial direction of the input shaft to vary the speed by varying the position of internal contact, and the second speed change unit includes: a second sun roller with a frustum conical shape provided to rotate integrally with the input shaft; a plurality of second planetary rollers provided to roll on an outer peripheral surface of the second sun roller; a second output ring provided to contact internally with the second planetary rollers and be able to freely rotate; and a second speed change ring provided to contact internally with conical portions formed integrally with the second planetary rollers and to be able to move in the axial direction of the input shaft to vary the speed by varying the position of internal contact, may be adopted.

According to this structure, the rotation speed of the rotational drive force input from the input shaft may be varied in the first speed change unit by appropriately driving the first speed change ring through the first sun roller, the plurality of first planetary rollers, the first output ring, and varied in the second speed change unit by appropriately driving the second speed change ring through the second sun roller, the plurality of second planetary rollers, the second output ring, and output as rotational drive force with the speed changed from the output shaft via the output rotating body.

In particular, the thrust loads in opposite directions acting on the first sun roller and the second sun roller may be taken by the input shaft so the loads are cancelled out, so it is possible to reduce the thrust load acting on the bearing, and so on, so it is possible to increase the contact pressure (normal load) between the first sun roller and the first planetary rollers and the contact pressure (normal load) between the second sun roller and the second planetary rollers, and reliably obtain the traction force. Also, by adopting common components for the two speed change units it is possible to simplify the structure, reduce the number of types of components, and reduce the cost.

In the above structure, a structure may be adopted in which the output rotating body is disposed between the first output ring and the second output ring, and a loading cam mechanism that enables transmission of rotational power and generates pressing force in the axial direction of the input shaft is disposed at least either between the first output ring and the output rotating body, or between the second output ring and the output rotating body.

According to this structure, when a rotation difference occurs between the first output ring and the output rotating body and the second output ring and the output rotating body, a pressing force may be generated in the axial direction of the input shaft by the cam action of the loading cam mechanism, so the normal force of the first output ring acting on the first planetary rollers or the normal force of the second output ring acting on the second planetary rollers, in other words the traction force, increases. In this way, even if an external load torque is applied, traction force can be reliably obtained, and the output shaft is reliably rotated and driven at the required speed change ratio.

In the above structure, a structure in which the output rotating body is integrally formed to one of the first output ring and the second output ring, and a loading cam mechanism that enables transmission of rotational power and generates pressing force in the axial direction of the input shaft is disposed between one of the first output ring and the second output ring and the output rotating body, may be adopted.

According to this structure, when a rotation difference occurs between one of the first output ring and the second output ring (and the output rotating body) and the other of the first output ring and the second output ring, a pressing force is generated in the axial direction of the input shaft by the cam action of the loading cam mechanism, so the normal force of the first output ring acting on the first planetary rollers or the normal force of the second output ring acting on the second planetary rollers, in other words the traction force, increases. In this way, even if an external load torque is applied, traction force can be reliably obtained, and the output shaft is reliably rotated and driven at the required speed change ratio.

In the above structure, a structure that includes a drive mechanism that drives in synchronization the first speed change ring and the second speed change ring to approach each other or separate from each other in the axial direction of the input shaft may be adopted.

According to this structure, the drive mechanism drives the two speed change rings simultaneously, so no deviation in the speed change ratio of the two speed change units (first speed change unit and second speed change unit) is caused, so it is possible to reliably carry out drive force transmission from the single input shaft, the two speed change units, and the single output shaft.

In the above structure, a structure that includes a trigger mechanism that turns on or off the transmission of rotational power between the first sun roller and the first planetary rollers, and/or between the second sun roller and the second planetary rollers using traction force, in accordance with the rotational speed of the input shaft, may be adopted.

According to this structure, the first sun roller (or the second sun roller) and the first planetary rollers (or the second planetary rollers) are not always directly connected (in close contact so that traction force is generated), but when the rotational speed of the input shaft increases, the trigger mechanism may be turned on and the rotational drive force of the first sun roller (or the second sun roller) is transmitted to the first planetary rollers (or second planetary rollers) via the traction force, so it is possible to couple the rotation of the input shaft to the output shaft at the required timing, on the other hand, when the rotational speed of the input shaft reduces, the trigger mechanism is turned off and the rotational drive force of the first sun roller (or the second sun roller) is not transmitted to the first planetary rollers (or second planetary rollers), so it is possible to make the output shaft free (capable of rotating in response to an external force) regardless of the rotation of the input shaft.

In the structure that includes the above trigger mechanism, a structure that includes impelling means for impelling the first sun roller in a direction to separate from the first planetary rollers, and/or impelling means for impelling the second sun roller in a direction to separate from the second planetary rollers may be adopted.

According to this structure, for example, if the rotational speed is slower than a predetermined speed level, the first sun roller (or the second sun roller) can be forcibly removed from the first planetary rollers (or second planetary rollers) in accordance with the rotational speed of the input shaft, whereby transmission of rotational power can be surely disconnected.

According to the continuously variable transmission with the above structure, it is possible to ensure sufficient traction force or transmission torque, improve the transmission efficiency, cancel out the thrust loads in the axial direction of the input shaft associated with an increase in normal load, and stably and reliably change the speed to the required speed change ratio, while simplifying the structure, reducing the size, improving the functional reliability, and reducing the cost, and so on.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5A is a perspective exploded diagram schematically showing the loading cam mechanism contained in the continuously variable transmission shown in FIG. 1;

EXPLANATION OF THE REFERENCE NUMERALS

Figure 1:
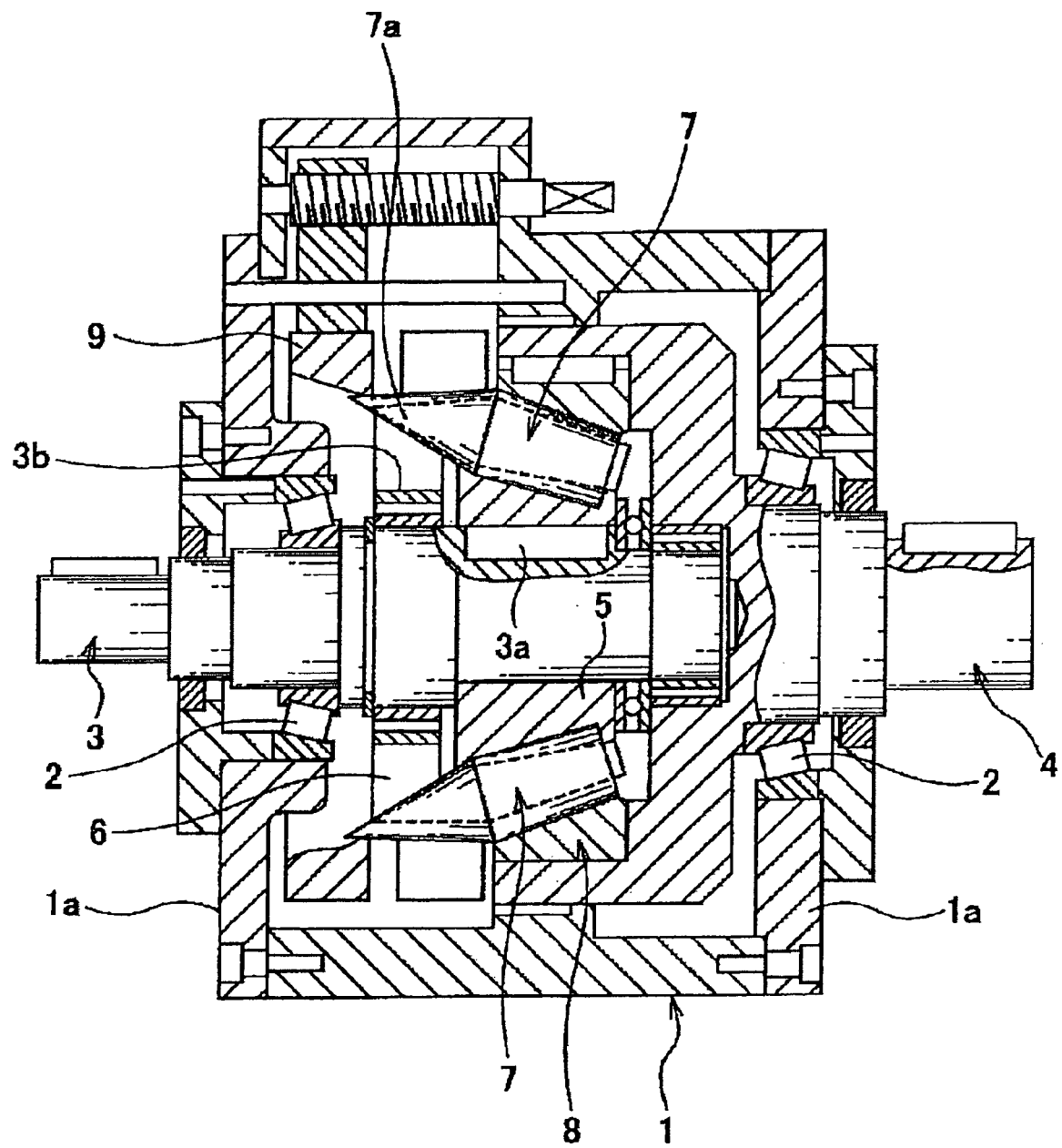
FIG. 1 is a section diagram showing a conventional continuously variable transmission.

L Input shaft axis direction
10 Housing
11 Flange wall portion
12 Bearing
13 Ring seal
14 Connecting guide rod
15, 16 Cover
17 Bearing
18 Ring seal
20, 20' Input shaft
21 External input shaft
21a Rotating flange
21b Connecting hole
22, 22' Internal input shaft
22a First end
22b Second end
22c Stopper
23 End input shaft
23a Rotating flange
23b Connecting hole
U1 First speed change unit
U2 Second speed change unit
30 First sun roller
30', 30" Second sun roller
31 Outer peripheral surface
32 Depression portion
32" Cylindrical portion
33" Reduced diameter cylindrical portion
40 First planetary roller
40' Second planetary roller
41 First conical portion
Second conical portion
Shaft
44 First movable holder
44' Second movable holder
50 First output ring
50', 50" Second output ring
51 Inner peripheral surface
52 End surface
53" Large diameter sleeve
54" Gear
55" Bearing
First speed change ring
60' Second speed change ring
61 Inner peripheral surface
62 Female screw portion
63 Guided portion
70 Drive mechanism
71 Lead screw
72 Gear
73 Worm
74 Motor
80, 80' Trigger mechanism
81 Centrifugal weight
82 End surface
83 Sloping surface
84 Coil spring (impelling means)
90 Output rotating gear (output rotating body)
91 Gear
92, 92' End surface
93, 93' Small diameter sleeve
94, 94' Large diameter sleeve
95 Bearing
100, 100' Loading cam mechanism
101, 102 Cam groove
103 Revolving body
110 Output shaft
111 Gear

DETAILED DESCRIPTION OF THE PREFERRED EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

Figure 2:
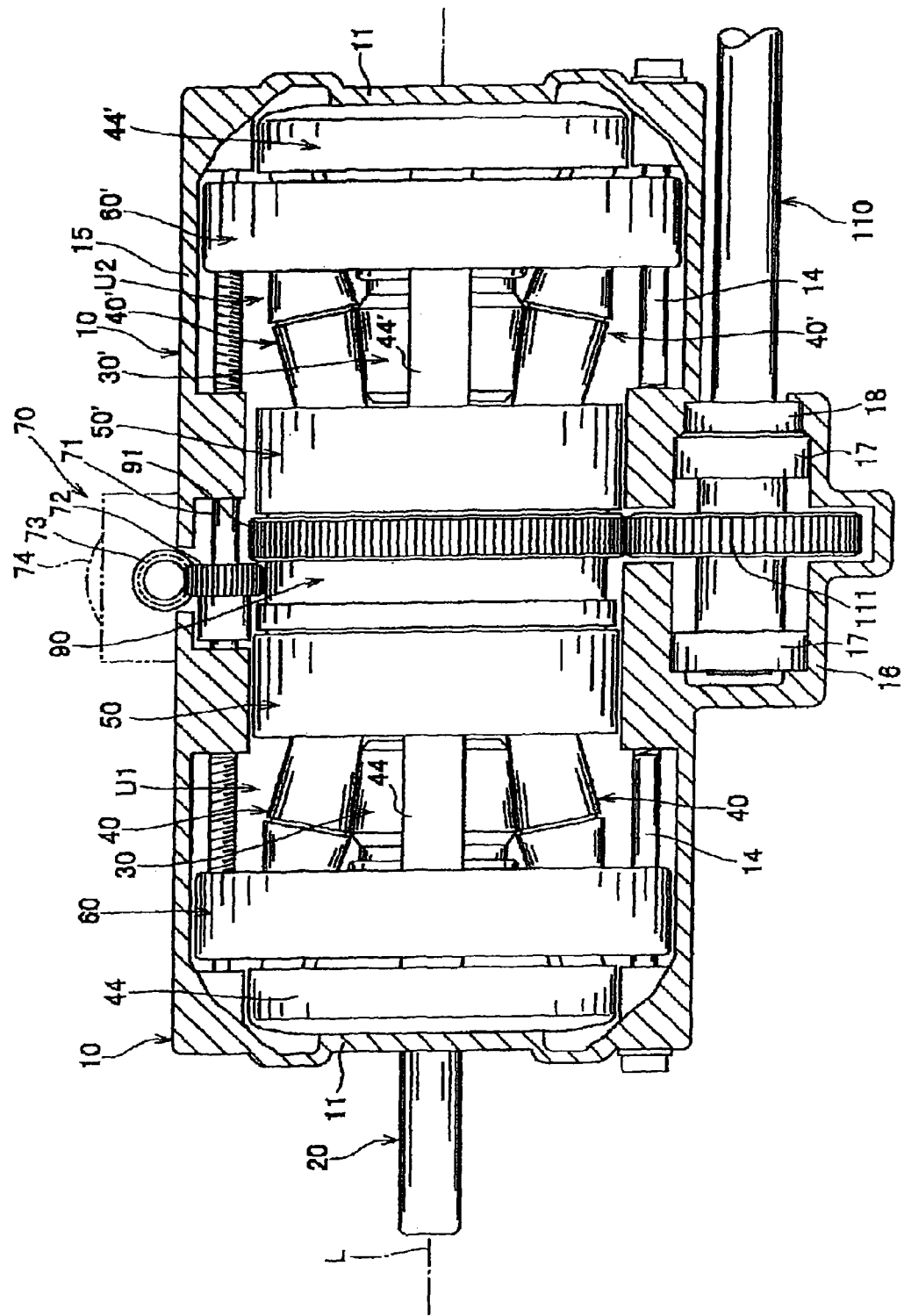
FIG. 2 is a partially sectioned diagram showing one embodiment of the continuously variable transmission according to the present invention.
Figure 3:
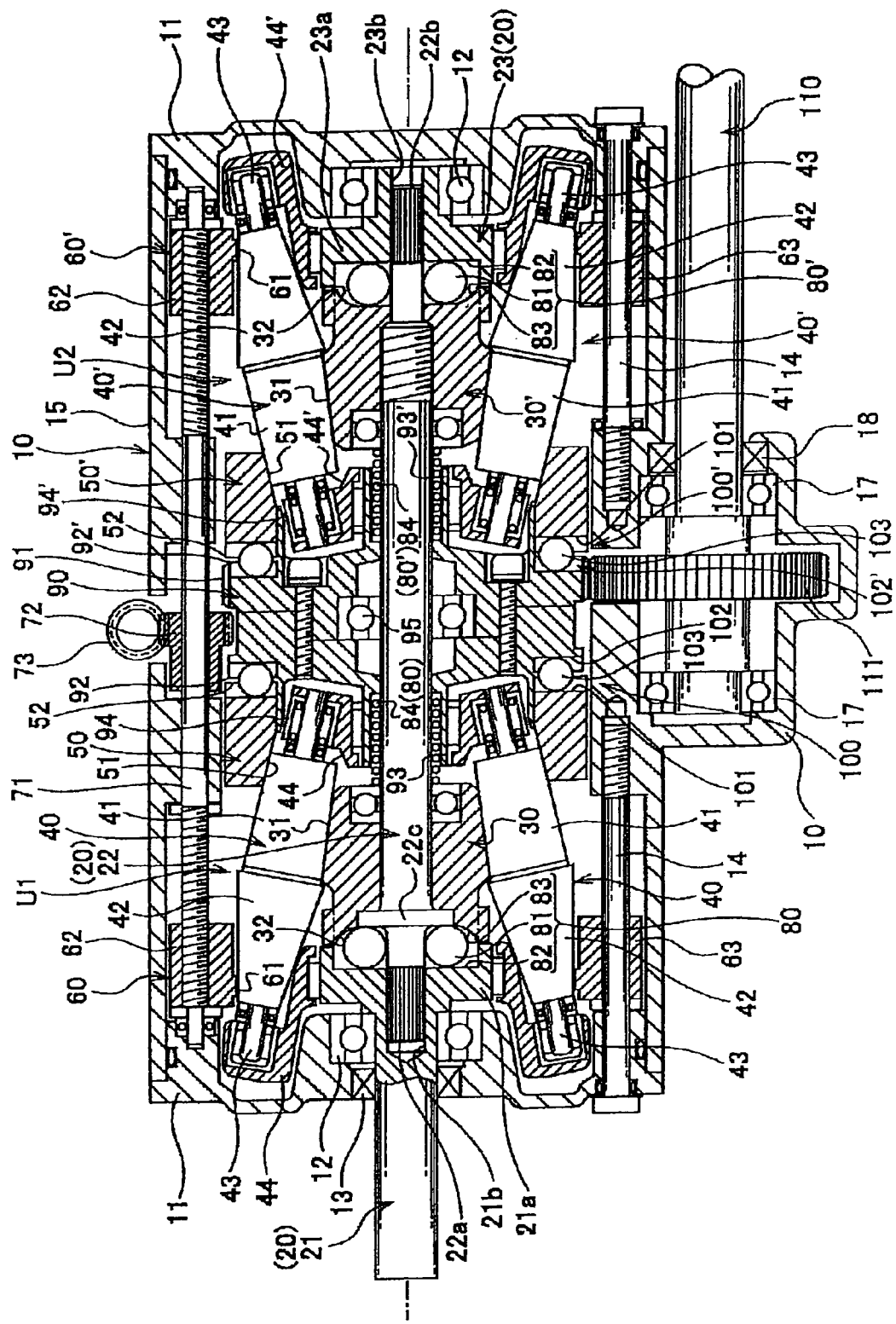
FIG. 3 is a section diagram showing the interior of the continuously variable transmission shown in FIG. 2.

As shown in FIGS. 2 and 3, the continuously variable transmission includes a housing 10, an input shaft 20, a first speed change unit U1 and a second speed change unit U2 symmetrically disposed with respect to a surface normal to the axial direction L of the input shaft 20 within the housing 10, a drive mechanism 70, a pair of trigger mechanisms 80, 80', an output rotating gear as output rotating body 90, a pair of loading cam mechanisms 100, 100', and an output shaft 110.

As shown in FIG. 3, the first speed change unit U1 includes a first sun roller 30 formed in the shape of the frustum of a cone, a plurality of first planetary rollers 40 that roll on the outer peripheral surface of the first sun roller 30, a first output ring 50 that contacts the first planetary rollers 40 internally and that is rotatably supported, and a first speed change ring 60 that rotatably contacts internally second conical portions 42 that are formed integrally on the first planetary rollers 40 and whose speed is varied by moving the internal contact position.

As shown in FIG. 3, the second speed change unit U2 includes a second sun roller 30' formed in the shape of the frustum of a cone, a plurality of second planetary rollers 40' that roll on the outer peripheral surface of the second sun roller 30', a second output ring 50' that contacts the second planetary rollers 40' internally and that is rotatably supported, and a second speed change ring 60' that rotatably contacts internally second conical portions 42 that are formed integrally on the second planetary rollers 40' and whose speed is varied by moving the internal contact position.

In other words, as shown in FIG. 3, the first speed change unit U1 (first sun roller 30, first planetary roller 40, first output ring 50, first speed change ring 60) and the second speed change unit U2 (second sun roller 30', second planetary roller 40', second output ring 50', second speed change ring 60') sandwich the output rotating gear 90 and the pair of loading cam mechanisms 100, 100', and are symmetrically disposed with respect to a normal plane (a surface normal to the axial direction of the input shaft 20) located in a position in approximately the center position of the housing 10 in the axial direction L of the input shaft 20.

As shown in FIGS. 2 and 3, the housing 10 includes a left and a right flange wall portion 11 that rotatably supports the input shaft 20, a bearing 12, a ring seal 13, a connecting guide rod 14 that connects the left and right flange wall portions 11, a cover 15 that covers the outer periphery, a cover 16 that supports the output shaft 110 as well as covers the surroundings of the output shaft 110, a bearing 17, and a ring seal 18.

Lubricating oil is supplied inside the housing to the contact boundary surfaces of the two speed change units U1, U2 where traction force is generated, other sliding surfaces, and rolling surfaces.

As shown in FIG. 3, the input shaft 20 is formed from an external shaft 21 that projects outside the housing 10 and transmits the drive force from an engine or the like, an internal input shaft 22 disposed within the housing 10 and connected so as to rotate integrally with the external input shaft 21, and an end input shaft 23 connected to the end of the internal input shaft 22.

As shown in FIG. 3, the external input shaft 21 includes a disk-shaped rotating flange 21a, and a connecting hole 21b for connecting the internal input shaft 22, and is rotatably supported on the housing 10 (flange wall portion 11) via the bearing 12. The rotating flange 21a is disposed in a position in opposition to the end surface of the first sun roller 30, and demarks an end surface 82 of the trigger mechanism 80, which is described later.

As shown in FIG. 3, the internal input shaft 22 includes a first end 22a, a second end 22b, and a stopper 22c, the first sun roller 30 is connected to the shaft so that the first sun roller 30 rotates integrally with the shaft and is capable of moving only a predetermined amount in the axial direction L (so that movement to the left is restricted by the stopped 22c), the second sun roller 30' is fixed to the shaft by a screwed joint so that the second sun roller 30' rotates integrally with the internal input shaft 22, and the first sun roller 30 and the second sun roller 30' are disposed in mutual opposition (so that the small diameter sides of the frustum shapes face each other). Also, the first end 22a of the internal input shaft 22 is inserted into the connecting hole 21b of the external input shaft 21, the second end 22b is inserted into a connecting hole 23b, which is described later, in the end input shaft 23, all disposed on the same axis (defined by the common axis line L).

As shown in FIG. 3, the end input shaft 23 includes a disk-shaped rotating flange 23a, and the connecting hole 23b to which the internal input shaft 22 is connected, and the end input shaft 23 is rotatably supported by the housing 10 (flange wall portion 11) via the bearing 12.

The external input shaft 21, the internal input shaft 22, and the end input shaft 23 are connected so that they rotate integrally about the axis line L and are capable of moving relative to each other in the axis line direction L.

As shown in FIG. 3, the first sun roller 30 is formed approximately in the shape of the frustum of a cone, and has an outer peripheral surface that is partly shaped like a conical surface on which the first planetary rollers 40 roll, and an end surface formed as a depression portion 32. The depression portion 32 of the first sun roller 30 is demarked by a sloping surface 83 that receives centrifugal weights 81 of the trigger mechanism 80.

As shown in FIG. 3, the second sun roller 30' is formed approximately in the shape of the frustum of a cone, and has an outer peripheral surface that is partly shaped like a conical surface on which the second planetary rollers 40' roll, and an end surface formed as a depression portion 32. The depression portion 32 of the second sun roller 30' is demarked by a sloping surface 83 that receives centrifugal weights 81 of the trigger mechanism 80'.

As shown in FIG. 3, the first planetary roller 40 includes a first conical portion 41 that rolls on the first sun roller 30 (outer peripheral surface 31), a second conical portion 42 with a tapering shape that contacts the first speed change ring 60 internally, and a common shaft 43 for the first conical portion 41 and the second conical portion 42.

As shown in FIG. 3, the second planetary roller 40' includes a first conical portion 41 that rolls on the second sun roller 30' (outer peripheral surface 31), a second conical portion 42 with a tapering shape that contacts the second speed change ring 60' internally, and a common shaft 43 for the first conical portion 41 and the second conical portion 42.

Figure 4:
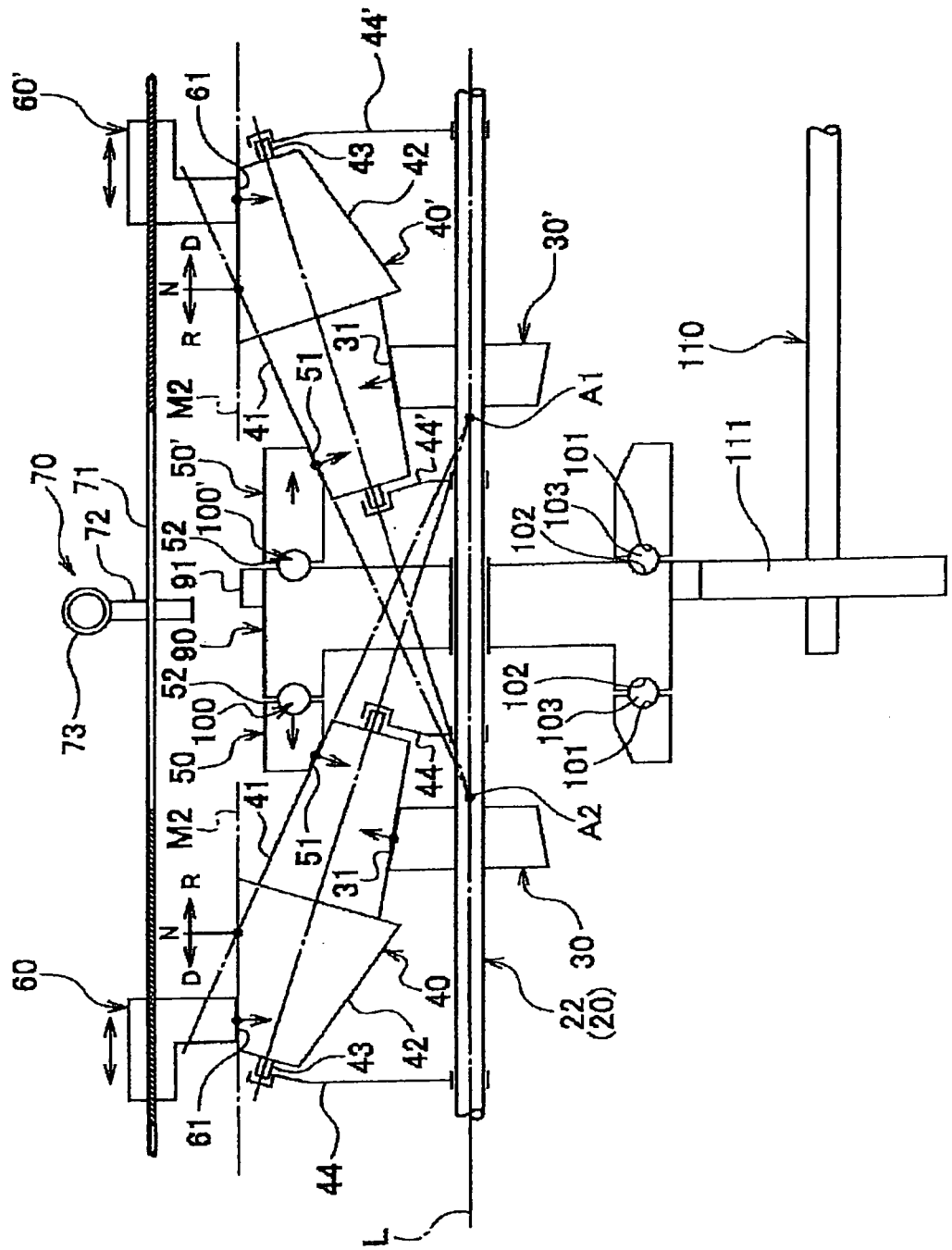
FIG. 4 is a pattern diagram showing the schematic constitution of the continuously variable transmission shown in FIG. 3.
Figure 5B:
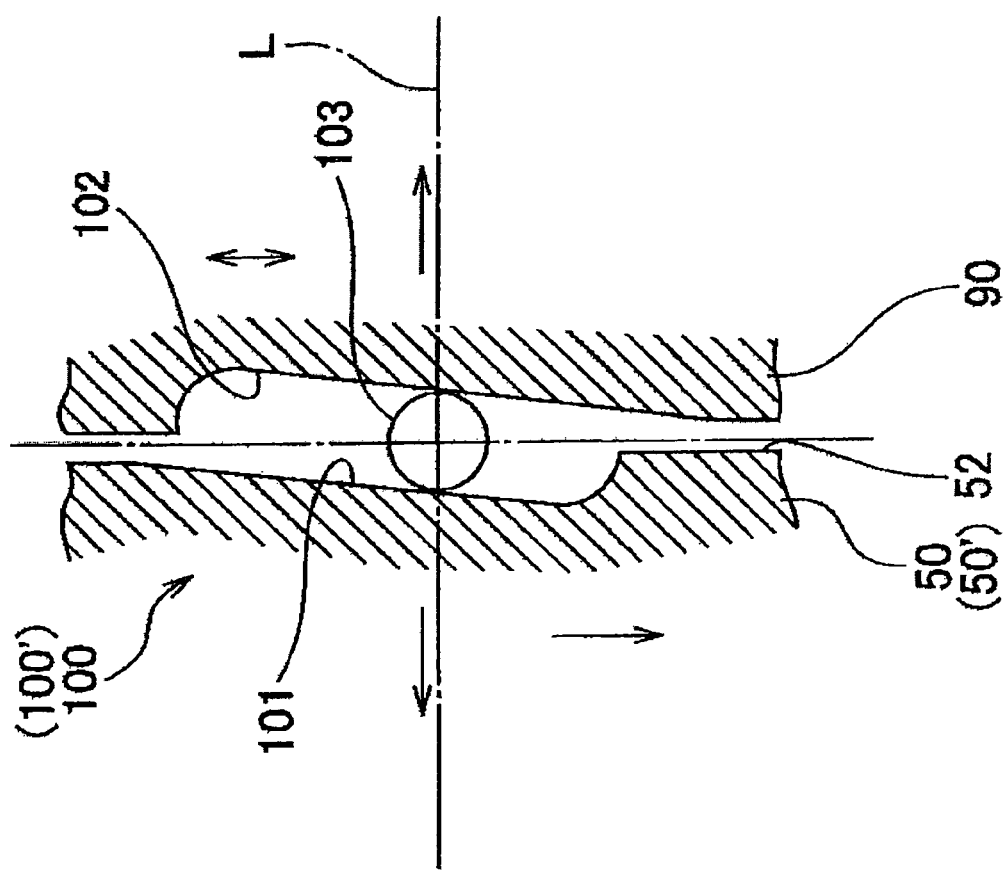
FIG. 5B is a partially sectioned diagram schematically showing the loading cam mechanism contained in the continuously variable transmission shown in FIG. 1.

As shown in FIGS. 3 and 4, the plurality of first sun rollers 40 contained in the first speed change unit U1 are supported by a first movable holder 44 so that the respective shafts 43 are disposed at equal intervals on an imaginary conical surface having its apex A1 on the right side within the housing 10. Also, as shown in FIG. 4, the plurality of second sun rollers 40' contained in the second speed change unit U2 are supported by a second movable holder 44' so that the respective shafts 43 are disposed at equal intervals on an imaginary conical surface having its apex A2 on the left side within the housing 10.

As shown in FIG. 4, the generating line M2 (the edge line that contacts both the first speed change ring 60 and the second speed change ring 60') of the second conical portion 42 located furthest away from the internal input shaft 22 in the diametric direction is formed so that the generating line M2 extends parallel to the axial direction L of the internal input shaft 22.

The shaft 43 of the first planetary roller 40 is supported so that it can move within a predetermined range with respect to the first movable holder 44. The shaft 43 of the second planetary roller 40' is supported so that it can move within a predetermined range with respect to the second movable holder 44'.

The first movable holder 44 is formed with an assembly structure (bird cage shape), and is supported via bearings by the outer peripheral surface of the rotating flange 21a of the external input shaft 21 and a small diameter sleeve 93 of the output shaft gear 90, which is described later, so that the first movable holder 44 does not contact other components within the housing 10, and so that the first movable holder 44 can rotate freely about the input shaft 20 (internal input shaft 22), and is supported so that the first planetary rollers 40 can roll.

The second movable holder 44' is formed with an assembly structure (bird cage shape), and is supported via bearings by the outer peripheral surface of the rotating flange 23a of the end input shaft 23 and a small diameter sleeve 93' of the output shaft gear 90, which is described later, so that the second movable holder 44' does not contact other components within the housing 10, and so that the second movable holder 44' can rotate freely about the input shaft 20 (internal input shaft 22), and is supported so that the second planetary rollers 40' can roll.

As shown in FIG. 3, the first output ring 50 is formed to include an inner peripheral surface 51 which the first conical portions 41 of the first planetary rollers 40 contact and roll thereupon, and a ring-shaped end surface 52 which is associated with the output rotating gear 90. The first output ring 50 is rotatably supported on a large diameter sleeve 94 of the output rotating gear 90, which is described later, so that the first output ring 50 can move in the axial direction L, and by rotating and revolving the first planetary rollers 40, the first output ring 50 is rotated by the traction force of the first planetary rollers 40. Therefore, by increasing the normal load on the inner peripheral surface 51, a greater traction force can be obtained, and the rotational power is more reliably transmitted.

As shown in FIG. 3, the second output ring 50' is formed to include an inner peripheral surface 51 which the first conical portions 41 of the second planetary rollers 40' contact and roll thereupon, and a ring-shaped end surface 52 with the output rotating gear 90 disposed therebetween. The second output ring 50' is rotatably supported on a large diameter sleeve 94' of the output rotating gear 90, which is described later, so that the second output ring 50' can move in the axial direction L, and by rotating and revolving the second planetary rollers 40', the second output ring 50' is rotated by the traction force of the second planetary rollers 40'. Therefore, by increasing the normal load on the inner peripheral surface 51, a greater traction force can be obtained, and the rotational power is more reliably transmitted.

As shown in FIG. 3, the first speed change ring 60 is formed to include an inner peripheral surface 61 that contacts the second conical portions 42 of the first planetary rollers 40, a female screw portion 62 that is threaded onto a lead screw 71 that forms part of the drive mechanism 70, a guided portion 63 that is fitted around and guided by the connecting guide rod 14, and so on. The first speed change ring 60 is supported within the housing 10 so that it cannot rotate about the input shaft 20 (internal input shaft 22), and is supported so that it can freely reciprocate within a predetermined range in the axial direction L of the input shaft 20 (internal input shaft 22).

As shown in FIG. 3, the second speed change ring 60' is formed to include an inner peripheral surface 61 that contacts the second conical portions 42 of the second planetary rollers 40', a female screw portion 62 that is threaded onto a lead screw 71 that forms part of the drive mechanism 70, a guided portion 63 that is fitted around and guided by a connecting guide rod 14, and so on. The second speed change ring 60' is supported within the housing 10 so that it cannot rotate about the input shaft 20 (internal input shaft 22), and is supported so that it can freely reciprocate within a predetermined range in the axial direction L of the input shaft 20 (internal input shaft 22).

As shown in FIGS. 2 and 3, the drive mechanism 70 includes the lead screw 71 disposed within the housing 10 extending parallel to the input shaft 20 (internal input shaft 22) and engaging with the female screw portions 62 of the first speed change ring 60 and the second speed change ring 60', a gear 72 fixed to the center of the lead screw 71, a worm 73 that meshes with the gear 72, and a motor 74 that drives and rotates the worm 73.

When the motor 74 rotates in one direction, the two speed change rings 60, 60' are driven (moved) in synchronization via the worm, gear 72, and lead screw 71 at the same time towards the center in the axial direction L in FIG. 4 so that the two speed change rings 60, 60' approach each other. On the other hand, when the motor 74 is rotated in the opposite direction, the two speed change rings 60, 60' are driven (moved) in synchronization via the worm 73, gear 72, and lead screw 71 at the same time towards the two outsides in the axial direction L in FIG. 4 so that the two speed change rings 60, 60' separate from each other.

In other words, by moving the first speed change ring 60 and the second speed change ring 60' in the axial direction L of the input shaft 20, the internal contact position of the second conical portions 42 of the first planetary rollers 40 and the second planetary rollers 40' with the inner peripheral surface 61 is moved, and as a result the speed is changed.

Specifically, as shown in FIG. 4, when the first speed change ring 60 and the second speed change ring 60' contact the second conical portions 42 at a certain middle position N, the first planetary rollers 40 roll with respect to the first output ring 50, and the second planetary rollers 40' roll with respect to the second output ring 50', the first output ring 50 and the second output ring 50' do not rotate but are stationary, so therefore the output shaft 110 is also stationary.

Next, if the contact position of the first speed change ring 60 and the second speed change ring 60' is moved towards the two sides within the housing 10 (as shown by the arrow D in FIG. 4), in other words the contact position is moved towards the small diameter end of the second conical portion 42, the rotation speed of the first output ring 50 and the second output ring 50' gradually increases, and the output shaft 110 also rotates at a faster speed.

On the other hand, if the first speed change ring 60 and the second speed change ring 60' are moved to the opposite side from the center position N (to the center of the housing 10) (as shown by the arrows R in FIG. 4), the contact position is moved towards the large diameter end of the second conical portion 42, and the first output ring 50 and the second output ring 50' rotate in the opposite direction.

In this way the drive mechanism 70 drives the first speed change ring 60 and the second speed change ring 60' at the same time, so it is possible to ensure there is no deviation in the speed change ratio of the two speed change units U1, U2, and it is possible to obtain reliable power transmission from the input shaft 20, the two speed change units U1, U2, the output rotating gear 90, and the output shaft 110.

The trigger mechanism 80 turns ON or OFF the transmission of rotational power in accordance with the rotational speed of the input shaft 20, or in other words the first sun roller 30, using the traction force between the first sun roller 30 and the first planetary rollers 40, and as shown in FIG. 3, the trigger mechanism 80 includes a plurality of spherical-shaped centrifugal weights 81, an end surface 82 formed in the rotating flange 21a of the external input shaft 21, a plurality of sloping surfaces 83 formed in the depression portion 32 of the first sun roller 30, and a coil spring 84 as impelling means that applies an impelling force to the first sun roller 30 in the direction to separate the first sun roller 30 from the first planetary rollers 40.

The trigger mechanism 80' turns ON or OFF the transmission of rotational power in accordance with the rotational speed of the input shaft 20, or in other words the second sun roller 30', using the traction force between the second sun roller 30' and the second planetary rollers 40', and as shown in FIG. 3, the trigger mechanism 80' includes a plurality of spherical-shaped centrifugal weights 81, an end surface 82 formed in the rotating flange 23a of the end input shaft 23, a plurality of sloping surfaces 83 formed in the depression portion 32 of the second sun roller 30', and a coil spring 84 as impelling means that applies an impelling force to the second sun roller 30' in the direction to separate the second sun roller 30' from the second planetary rollers 40'.

When the rotation speed of the input shaft 20 (first sun roller 30) is increased from the state in which the first sun roller 30 and the first planetary rollers 40 are idling relative to each other (the state in which there is no traction force acting on their contact surface), the centrifugal weights 81 of the trigger mechanism 80 move to the outside in the diametric direction and press on the sloping surface 83, so the first sun roller 30 is pressed inwards in the axial direction L of the internal input shaft 22 (ON action). In other words, the first sun roller 30 is pressed by the plurality of first planetary rollers 40. As a result, traction force is generated, the rotational drive force of the input shaft 20 (first sun roller 30) is transmitted to the first planetary rollers 40, and at the required timing is transmitted to the output shaft 110.

On the other hand, when the rotational speed of the input shaft 20 (first sun roller 30) reduces, the centrifugal weights 81 move towards the center in the diametric direction, the force pressing against the sloping surface 83 weakens, and the first sun roller 30 is withdrawn slightly from the plurality of first planetary rollers 40 by the impelling force of the coil spring 84 (OFF action). As a result the traction force reduces, the rotational drive force of the input shaft 20 (first sun roller 30) is not transmitted to the first planetary rollers 40, and the output shaft 110 can rotate freely (rotates due to an external force) regardless of the rotation of the input shaft 20 (first sun roller 30).

In this way, the first sun roller 30 is formed so that its wedge action is strengthened when the trigger mechanism 80 is in the ON state, so it is possible to reliably obtain normal load, in other words traction force, at the contact surface between the first sun roller 30 and the first planetary rollers 40.

The trigger mechanism 80' performs the same action with respect to the second sun roller 30' and the second planetary rollers 40' as described for the trigger mechanism 80, so its explanation has been omitted.

As shown in FIG. 3, the output rotation gear 90 includes a gear 91 formed on the outer peripheral surface thereof, end surfaces 92, 92', small diameter sleeves 93, 93', and large diameter sleeves 94, 94', and is rotatably supported by the internal input shaft 22 via a bearing 95.

The end surface 92 is in opposition to the end surface 52 of the first output ring 50, and the end surface 92' is in opposition to the end surface 52 of the second output ring 50'.

As shown in FIGS. 3 through 5B, the loading cam mechanism 100 includes a plurality of circular arc shaped cam grooves 101 formed in the end surface 52 of the first output ring 50, a plurality of cam grooves 102 formed in the end surface 92 of the output rotating gear 90 corresponding to the cam grooves 101, and a rolling body 103 disposed between the two cam grooves 101, 102.

As shown in FIGS. 3 through 5B, the loading cam mechanism 100' includes a plurality of circular arc shaped cam grooves 101 formed in the end surface 52 of the second output ring 50', a plurality of cam grooves 102 formed in the end surface 92 of the output rotating gear 90 corresponding to the cam grooves 101, and a rolling body 103 disposed between the two cam grooves 101, 102.

In other words, when a difference in relative rotation occurs between the first output ring 50 and the output rotating gear 90, the rolling body 103 of the loading cam mechanism 100 moves and is subject to the cam action of the cam grooves 101, 102, and a thrust force is generated in the axial direction L of the input shaft 20 (internal input shaft 22). Therefore, the normal force on the contact surface between the first output ring 50 and the first planetary rollers 40 (and the second output ring 50' and the second planetary rollers 40') increases, and, as a reaction to the thrust load, the first output ring 50 (and the second output ring 50') and the output rotating gear 90 rotate integrally.

Also, when a difference in relative rotation occurs between the second output ring 50' and the output rotating gear 90, the rolling body 103 of the loading cam mechanism 100' moves and is subject to the cam action of the cam grooves 101, 102, and a thrust force is generated in the axial direction L of the input shaft 20 (internal input shaft 22). Therefore, the normal force on the contact surface between the second output ring 50' and the second planetary rollers 40' (and the first output ring 50 and the first planetary rollers 40) increases, and, as a reaction to the thrust load, the second output ring 50' (and the first output ring 50) and the output rotating gear 90 rotate integrally.

In other words, the load torque of the output shaft 110 increases the pressing load (normal load), in other words the traction force, of the first output ring 50 on the first planetary rollers 40 or the second output ring 50' on the second planetary rollers 40' via the loading cam mechanism 100, 100'.

Also, when the normal load of the first output ring 50 pressing on the first planetary rollers 40 increases, the contact pressure (normal load) between the first sun roller 30 and the first planetary rollers 40 also increases, so the contact pressure (normal load) between the second conical portions 42 of the first planetary rollers 40 and the first speed change ring 60 also increases, with the contact position of the first sun roller 30 and the first planetary rollers 40 as support points.

Further, when the normal load of the second output ring 50' pressing on the second planetary rollers 40' increases, the contact pressure (normal load) between the second sun roller 30' and the second planetary rollers 40' also increases, so the contact pressure (normal load) between the second conical portions 42 of the second planetary rollers 40' and the second speed change ring 60' also increases, with the contact position of the second sun roller 30' and the second planetary rollers 40' as support points.

Therefore, overall, when the normal load increases in the traction drive, traction force can be reliably obtained even if the load torque from the outside varies, so the output shaft 110 is reliably rotated and driven at the required speed change ratio.

As shown in FIGS. 2 and 3, the output shaft 110 is provided integrally with a gear 111 that meshes with the gear 91 of the output rotating gear 90, and is rotatably supported by the housing 10 via the bearing 17 and the ring seal 18.

Therefore, the rotational drive force of the input shaft 20 is changed in speed by the two speed change units U1, U2, and the rotational drive force after speed change is transmitted to the output shaft 110 via the output rotating gear 90.

Next, the operation of the above continuously variable transmission is explained.

First, when the input shaft 20 is stationary, there is no traction force generated between the two speed change units (first speed change unit U1, second speed change unit U2) and torque is not transmitted, so the output shaft 110 can freely rotate (OFF state).

Then, when the input shaft 20 starts to rotate from the stationary state, as the rotational speed increases, the trigger mechanisms 80, 80' are turned ON (the centrifugal weights 81 move to the outside in the diametric direction, the first sun roller 30 is moved into the first planetary rollers 40, and the second sun roller 30' is moved into the second planetary rollers 40'), the first sun roller 30 presses against the first planetary rollers 40, and the second sun roller 30' presses against the second planetary rollers 40', and when a specific level or more of normal load, in other words traction force, is generated, torque (rotational drive force) is transmitted from the first sun roller 30 to the first planetary rollers 40, and from the second sun roller 30' to the second planetary rollers 40'.

Then, the first speed change ring 60 and the second speed change ring 60' are appropriately driven at the same time by the drive mechanism 70, and the rotational speed that has been changed via the first sun roller 30, the plurality of first planetary rollers 40, the first output ring 50, and the second sun roller 30', the plurality of second planetary rollers 40', and the second output ring 50' is transmitted to the output rotating gear 90 via the loading cam mechanisms 100, 100', and the output shaft 110 rotates.

On the other hand, when the load torque is applied to the output shaft 110, the loading cam mechanisms 100, 100' operate, and the pressing force (normal load) of the first output ring 50 on the first planetary rollers 40 and the pressing force (normal load) of the second output ring 50' on the second planetary rollers 40', in other words the traction force, is increased. In this way, even if a load torque from outside is applied, the traction force can be reliably obtained, and the output shaft 110 is reliably rotated and driven at the required speed change ratio.

In the above traction drive, a thrust load is generated in the axial direction L of the input shaft 20 in the two speed change units U1, U2, but the two speed change units U1, U2 are symmetrically disposed with respect to a surface normal to the axial direction L of the input shaft 20, so the respective thrust loads act in opposite directions and can cancel each other out. As a result, it is possible to prevent the application of unreasonable loads to the housing 10 or to the bearing 12 of the input shaft 20, and so on.

In particular, the thrust loads in opposite directions acting on the first sun roller 30 and the second sun roller 30' are taken by the input shaft 20 (internal input shaft 22) so the loads are cancelled out, so it is possible to reduce the thrust load acting on the bearing 12, so it is possible to increase the contact pressure (normal load) between the first sun roller 30 and the first planetary rollers 40 and the contact pressure (normal load) between the second sun roller 30' and the second planetary rollers 40', and reliably obtain the traction force. Also, by adopting common components for the two speed change units U1, U2 it is possible to simplify the structure, reduce the number of types of components, and reduce the cost.

In other words, according to the embodiment described above, it is possible to ensure sufficient traction force or transmission torque, improve the transmission efficiency, cancel out the thrust load in the axial direction L of the input shaft 20 associated with the increase in the normal load, and stably and reliably change the speed to the required speed change ratio, while simplifying the structure, reducing the size, improving the functional reliability, and reducing the cost.

Figure 6:
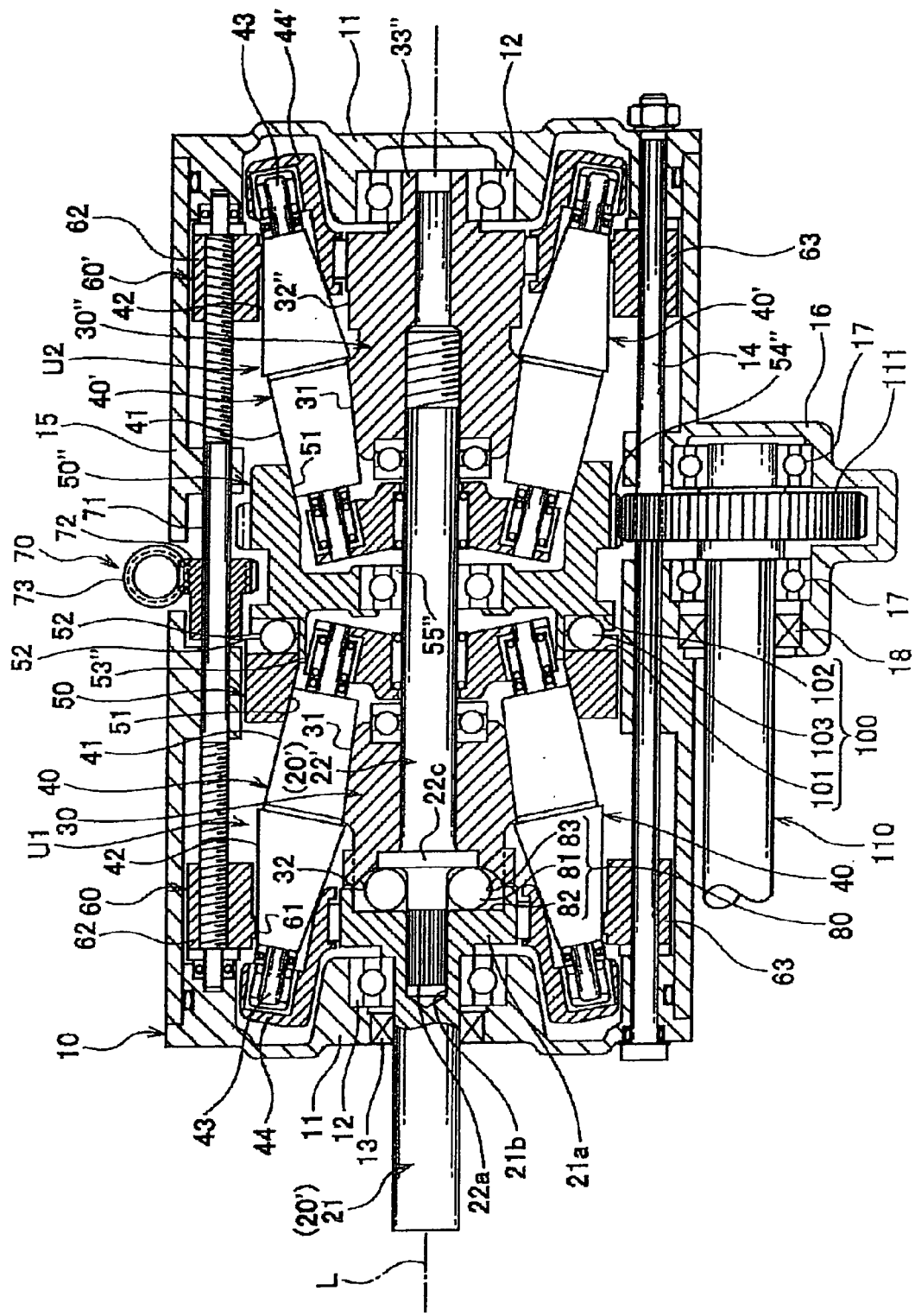
FIG. 6 is a section diagram showing another embodiment of the continuously variable transmission according to the present invention.

FIG. 6 shows another embodiment of the continuously variable transmission according to the present invention, which apart from elimination of the coil spring 84, adoption of a single trigger mechanism 80 and a single loading cam mechanism 100, and forming the second output ring integral with the output rotating body, is the same as the embodiment described above. Therefore, for the constitution that is the same as the embodiment described above, the same reference numerals are used, and the explanation is omitted.

As shown in FIG. 6, this continuously variable transmission includes a housing 10, an input shaft 20', a first speed change unit U1 (first sun roller 30, first planetary rollers 40, first output ring 50, first speed change ring 60) and a second speed change unit U2 (second sun roller 30", second planetary rollers 40', with second output ring 50" serving as an output rotating body, second speed change ring 60), a drive mechanism 70, a trigger mechanism 80, a loading cam mechanism 100, and an output shaft 110.

As shown in FIG. 6, the input shaft 20' is formed from an external input shaft 21 and an internal input shaft 22'.

As shown in FIG. 6, the internal input shaft 22' includes a first end 22a, a second end 22b, and a stopper 22c, disposed so that the first sun roller 30 and the second sun roller 30" are in mutual opposition (so that the small diameter sides of the frustum of a cone shapes face each other), the first sun roller 30 is connected to the internal input shaft 22' so that the first sun roller 30 rotates integrally with the internal input shaft 22' and is capable of moving only a predetermined amount in the axial direction L (so that movement to the left is restricted by the stopper 22c), and the second sun roller 30" is fixed by a threaded joint to rotate integrally.

As shown in FIG. 6, the second sun roller 30" is formed in approximately the shape of a frustum of a cone, and is formed to include an external peripheral surface 31, a cylindrical portion 32", a reduced diameter cylindrical portion 33", and so on. The reduced diameter cylindrical portion 33" is rotatably supported by the housing 10 (flange wall portion 11) via a bearing 12.

As shown in FIG. 6, the second output ring 50" is formed to include an internal peripheral surface 51, a ring shaped end surface 52 which is associated with an output rotating gear 90, a large diameter sleeve 53" supporting the first output ring 50, and a gear 54" that meshes with a gear 111 of the output shaft 110.

The second output ring 50" is rotatably supported by the internal input shaft 22' via a bearing 55" so that a small amount of movement is possible in the axial direction L, and by rotating and revolving the second planetary roller 40', the traction force causes the second output ring 50" to rotate.

In other words, an item (gear 54") that corresponds to the output rotating gear 90 as described above is formed integrally with the second output ring 50".

In this embodiment also, as stated previously, the torque of the input shaft 20' can be doubled by the two speed change units U1, U2 while continuously varying the speed, and also the two speed change units U1, U2 are disposed facing each other and symmetrically with respect to a plane normal to the axial direction L of the input shaft 20', so the thrust loads generated in the two speed change units U1, U2 in the axial direction L of the input shaft 20' act in opposite directions and cancel each other out. Therefore, it is possible to prevent the application of unreasonable load on the housing 10 or the bearing 12 of the input shaft 20'. Also, the temperature rise in the area around the bearing 12 and elsewhere can be reduced, so it is possible to form a lubrication oil film on the contact surfaces and reliably obtain the traction force.

In other words, according to this embodiment, it is possible to ensure sufficient traction force or transmission torque, reduce the cost, improve the transmission efficiency, cancel out the thrust load in the axial direction L of the input shaft 20' associated with the increase in the normal load, and stably and reliably change the speed to the required speed change ratio, while simplifying the structure, reducing the size, and improving the functional reliability.

In the above embodiments, the two speed change units U1, U2 were described as having the sun roller 30, 30', the planetary rollers 40, 40', the output rings 50, 50', the speed change rings 60, 60', and so on, but the embodiments are not limited to this, and speed change units with a different structure may be adopted provided speed change can be carried out using traction force.

In the above embodiments, cases where the loading cam mechanisms 100, 100' were adopted were described, but the embodiments are not limited to this, and a constitution in which the drive force is directly transmitted from the output rings 50, 50' to the output rotating gear 90 may be adopted.

In the above embodiments, cases in which the two trigger mechanisms 80, 80' or a single trigger mechanism 80 were adopted were described, but the embodiments are not limited to this, and the trigger mechanisms 80, 80' may be eliminated.

In the above embodiments, the case in which impelling means (coil spring 84) was adopted as a part of the trigger mechanisms 80, 80' was described, but the embodiments are not limited to this, and impelling means (coil spring 84) may be adopted on one side only, or the impelling means (coil spring 84) may be eliminated.

Although a few embodiments of the present invention have been shown and described, it would be appreciated by those skilled in the art that changes may be made in these embodiments without departing from the principles and spirit of the invention, the scope of which is defined in the claims and their equivalents.

INDUSTRIAL APPLICABILITY

In the continuously variable transmission according to the embodiments described above, it is possible to ensure sufficient traction force or transmission torque, improve the transmission efficiency, and reliably change the speed to the required speed change ratio, while simplifying the structure, reducing the size, and improving the functional reliability, so of course it can be adopted as the speed change device mounted in a vehicle or the like, and it may be used in other drive devices, mechanical devices, working machines, and so on, provided the rotational speed of the rotational drive force input from the input shaft is continuously varied and output from the output shaft.

What is claimed is:

1. A continuously variable transmission, comprising:
   a housing;
   an input shaft rotatably supported in the housing;
   a first speed change unit and a second speed change unit, provided within the housing and disposed facing each other symmetrically with respect to a plane normal to the axial direction of the input shaft, to continuously vary the speed of rotation of the input shaft using traction force;
   an output rotating body supported to be able to rotate freely about the input shaft so that the rotation of the output rotating body is synchronized with the rotation which has been varied in speed by the first speed change unit and the second speed change unit; and
   an output shaft rotatably supported in the housing to rotate in synchronization with the output rotating body,
   wherein the first speed change unit comprises
      a first sun roller with a frustum conical shape provided to rotate integrally with the input shaft;
      a plurality of first planetary rollers provided to roll on an outer peripheral surface of the first sun roller;
      a first output ring provided to contact internally with the first planetary rollers and to be able to freely rotate; and
      a first speed change ring provided to contact internally with conical portions formed integrally with the first planetary rollers and to be able to move in the axial direction of the input shaft to vary the speed by varying the position of internal contact,
   the second speed change unit comprises
      a second sun roller with a frustum conical shape provided to rotate integrally with the input shaft;
      a plurality of second planetary rollers provided to roll on an outer peripheral surface of the second sun roller;
      a second output ring provided to contact internally with the second planetary rollers and to be able to freely rotate; and
      a second speed change ring provided to contacted internally with conical portions formed integrally with the second planetary rollers and to be able to move in the axial direction of the input shaft to vary the speed by varying the position of internal contact, and
   the continuously variable transmission further comprises a loading cam mechanism that generates pressing force in the axial direction of the input shaft by a difference in rotation between the output shaft and the first output ring or the second output ring.

2. The continuously variable transmission according to claim 1, wherein
   the output rotating body is disposed between the first output ring and the second output ring, and
   the loading cam mechanism that enables transmission of rotational power is disposed at least either between the first output ring and the output rotating body or between the second output ring and the output rotating body.

3. The continuously variable transmission according to claim 1, wherein
   the output rotating body is integrally formed to one of the first output ring and the second output ring, and
   the loading cam mechanism that enables transmission of rotational power is disposed between one of the first output ring and the second output ring and the output rotating body.

4. The continuously variable transmission according to claim 1, further comprising a drive mechanism that drives in synchronization the first speed change ring and the second speed change ring to approach each other or separate from each other in the axial direction of the input shaft.

5. The continuously variable transmission according to claim 1, further comprising a pair of trigger mechanisms, the pair of trigger mechanisms including one trigger mechanism to turn on or off transmission of rotational power between the first sun roller and the first planetary rollers, and another trigger mechanism to turn on or off transmission of rotational power between the second sun roller and the second planetary rollers, the pair of trigger mechanisms using traction force, according to the rotational speed of the input shaft.

6. The continuously variable transmission according to claim 2, further comprising a single trigger mechanism to turn on or off transmission of rotational power between one of the first sun roller and the first planetary rollers and the second sun roller and the second planetary rollers using traction force, according to the rotational speed of the input shaft.

7. The continuously variable transmission according to claim 5, further comprising:
   impelling means for impelling the first sun roller in a direction to separate from the first planetary rollers; and
   impelling means for impelling the second sun roller in a direction to separate from the second planetary rollers.

8. The continuously variable transmission according to claim 5, further comprising impelling means for impelling the first sun roller in a direction to separate from the first planetary rollers or for impelling the second sun roller in a direction to separate from the second planetary rollers.

* * * * *